Oct. 10, 1939.　　　L. E. LIGHTON　　　2,175,993
FILLING AND VENTING DEVICE
Filed Feb. 23, 1937
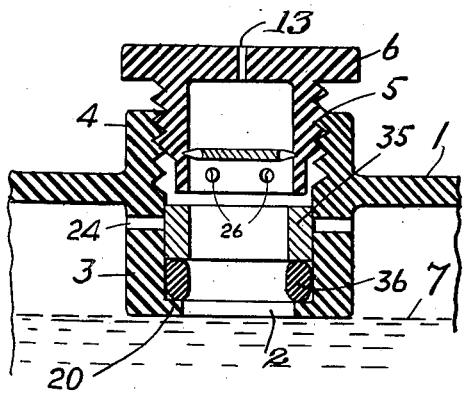
WITNESS:
Rob R Kitchel.
INVENTOR
Lester E. Lighton
BY
Augustus B. Stoughton
ATTORNEY.

Patented Oct. 10, 1939

2,175,993

UNITED STATES PATENT OFFICE 2,175,993

FILLING AND VENTING DEVICE

Lester E. Lighton, Glenside, Pa., assignor to The Electric Storage Battery Company, Philadelphia, Pa., a corporation of New Jersey Application February 23, 1937, Serial No. 127,027

3 Claims. (Cl. 136—178)

In certain classes of service, especially for automobile starting and lighting, the storage battery is so designed and located that it is very difficult to fill it to the proper level on account of the fact that the level of the electrolyte cannot be seen during the filling operation until the cell has been over-filled. Therefore, the principal object of this invention is to prevent such over-filling under these conditions.

In general, the invention may be described broadly as consisting of a filling-opening through the cover of the cell, provided with a depending tubular structure extending down to the maximum desired level of the electrolyte, outside of which tube, between the surface of the electrolyte and the under surface of the cover, there is provided a space for trapped gas which, in the absence of any vent, will prevent the electrolyte from rising into this space above the lower end of the said tube. If under these conditions the tube is filled with electrolyte up to a point where its upper surface can be observed, it will contain only a comparatively insignificant amount of electrolyte. If thereafter the space containing the trapped gas is vented into the atmosphere, the level of the excess electrolyte in the filling tube will fall to that in the cell outside of the filling tube without causing the latter to rise appreciably, and the cell will then have been filled to the desired level without any danger of overfilling.

In accordance with this invention, means for venting the space is provided above the electrolyte level between the outside of the filling tube and the underside of the cell cover, including a valve device which closes the seal when the vent plug is removed from the top of the filling tube for filling purposes but is opened by the travel of the vent plug when the latter is replaced.

For a further exposition of my invention, reference may be had to the annexed drawing and specification, at the end thereof my invention will be specifically pointed out and claimed.

In the drawing:

The figure shows a vertical sectional elevation of a venting device for the cover of a storage battery embodying features of the invention.

In the figure 1 is the cover of a storage cell having a vent opening 2 defined by a tubular projection 3 from the underside and a boss 4 from the upper side. The boss 4 is internally threaded at 5 to receive corresponding external threads in the vent plug 6, which as shown is only partly screwed down into position. The electrolyte level is indicated at 7.

The vents 24 from the space beneath the cover are closed when the vent plug 6 is removed by the tubular member 35 which may be of hard rubber or similar rigid material, this member 35 being held in its upper position by a resilient ring of soft rubber 36 resting on the internally projecting ledge 20. When the vent plug 6 is screwed all the way down into the operating position, it will push the tubular member 35 downwardly, compressing the soft rubber ring 36 and uncovering the vents 24. Vent openings 26 are provided in the lower projection 25 of the vent plug.

I do not intend to be limited save as the scope of the prior art and of the attached claims may require.

I claim:

1. In a storage battery cell containing electrolyte and having a hermetically sealed cover, a filling tube extending through the cover to the normal electrolyte level, a vent through the tube wall communicating with the space under the cover above the electrolyte, a ring-shaped valve mounted for axial travel within the tube below said vent and adapted to open and close said vent, a resilient ring stressing said valve to closed position, and a vent plug mounted in said filling tube and adapted to engage said valve and to move said valve to open position against the stress of said resilient ring.

2. In a storage battery cell containing electrolyte and having a hermetically sealed cover, a filling tube extending through the cover to the normal electrolyte level, a vent through the tube wall communicating with the space under the cover above the electrolyte, a ring-shaped valve mounted for axial travel within the tube below said vent and adapted to open and close said vent, a resilient member stressing said valve to closed position, and a vent plug mounted in said filling tube and adapted to engage said valve and to move said valve to open position against the stress of said resilient member.

3. In a storage battery cell containing electrolyte and having a hermetically sealed cover, a filling tube extending through the cover to the normal electrolyte level, a vent through the cover communicating with the space under the cover above the electrolyte at a point distant from the interior of said filling tube, a valve of rigid material having surfaces co-operating with the interior of said filling tube so that said valve is mounted for axial movement within the tube below said vent, said valve having a portion of greater area than the cross-sectional area of said vent and adapted to open and close said vent, a resilient member stressing said valve to closed position, and a vent plug mounted in said filling tube and adapted to engage said valve and to move said valve to open position against the stress of said resilient member.

LESTER E. LIGHTON.